(12) United States Patent
Kitamura et al.

(10) Patent No.: US 11,984,925 B2
(45) Date of Patent: May 14, 2024

(54) TRANSMISSION APPARATUS AND TRANSMISSION METHOD

(71) Applicant: NIPPON TELEGRAPH AND TELEPHONE CORPORATION, Tokyo (JP)

(72) Inventors: Kei Kitamura, Musashino (JP); Fumikazu Inuzuka, Musashino (JP); Kengo Shintaku, Musashino (JP); Takafumi Tanaka, Musashino (JP); Takuya Oda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/766,451

(22) PCT Filed: Oct. 30, 2019

(86) PCT No.: PCT/JP2019/042486
§ 371 (c)(1),
(2) Date: Apr. 4, 2022

(87) PCT Pub. No.: WO2021/084635
PCT Pub. Date: May 6, 2021

(65) Prior Publication Data
US 2024/0056179 A1  Feb. 15, 2024

(51) Int. Cl.
*H04B 10/032* (2013.01)
*H04B 10/07* (2013.01)
(Continued)

(52) U.S. Cl.
CPC .......... *H04B 10/032* (2013.01); *H04B 10/07* (2013.01); *H04B 10/564* (2013.01);
(Continued)

(58) Field of Classification Search
None
See application file for complete search history.

(56) References Cited

U.S. PATENT DOCUMENTS 5,469,427 A * 11/1995 Sato .................... G06F 11/2005
714/E11.078
2009/0089601 A1 * 4/2009 Nonaka .................. H04L 12/10
713/323
(Continued)

FOREIGN PATENT DOCUMENTS

JP         07095132 A    4/1995
JP       2008048213 A    2/2008
(Continued)

OTHER PUBLICATIONS

Fujisu: "A Thinking Network That Supports MetaArc for Business Digital Transformation", Fujitsu Network Virtuora/Fujitsu Network 1FINITY, Fujitsu Forum 2017, 2017 (Year: 2017).*
(Continued)

*Primary Examiner* — Li Liu
(74) *Attorney, Agent, or Firm* — Harness, Dickey & Pierce, P.L.C.

(57) ABSTRACT

A transmission apparatus includes a first communication unit, a second communication unit, a detection unit, a control unit, and a selection unit. The first communication unit uses a first path for communication, when electric power is supplied. The second communication unit uses a second path for communication, when electric power is supplied. The detection unit detects a fault predictive sign. The control unit supplies no electric power to the second communication unit when the detection unit does not detect the fault predictive sign. The control unit starts supplying electric power to the second communication unit and performs normality confirmation of the second path when the detection unit detects the fault predictive sign, before
(Continued)

switching from the first path to the second path. The selection unit selects and outputs, when the first communication unit and the second communication unit have received signals, either the signal received by the first communication unit or the signal received by the second communication unit.

2 Claims, 7 Drawing Sheets

(51) Int. Cl.
    *H04B 10/564*     (2013.01)
    *H04J 14/02*     (2006.01)
    *H04Q 11/00*     (2006.01)

(52) U.S. Cl.
    CPC ...... *H04J 14/0293* (2013.01); *H04Q 11/0062* (2013.01); *H04Q 2011/0081* (2013.01); *H04Q 2213/08* (2013.01)

(56) References Cited

U.S. PATENT DOCUMENTS

2012/0315030 A1* 12/2012 Singh ................ H04L 49/101
    398/1

2013/0170825 A1* 7/2013 Hu ...................... H04B 10/032
    398/5

FOREIGN PATENT DOCUMENTS

| | | | |
|---|---|---|---|
| JP | 2009100442 A | 5/2009 | |
| JP | 2013005210 A | 1/2013 | |
| JP | 2013243559 A | 12/2013 | |
| WO | WO-2014/050022 A1 | 4/2014 | |
| WO | WO-2014050022 A1 * | 4/2014 | ............ H04L 45/00 |
| WO | WO-2017/170006 A1 | 10/2017 | |
| WO | WO-2017170006 A1 * | 10/2017 | |

OTHER PUBLICATIONS

A Thinking Network That Supports MetaArc for Business Digital Transformation, Fujitsu Network Virtuora/Fujitsu Network 1FINITY, Fujitsu Forum 2017, 2017.

Kitamura et al., "Large capacity ODU path protection without bit disruption for low latency core/metro network", IEICE Technical Report, vol. 118, No. 505, pp. 73-76, (PN2018-95), Mar. 7, 2019.

International Search Report issued in PCT/JP2019/042486, dated Jan. 21, 2020; ISA/JP.

* cited by examiner

TRANSMISSION APPARATUS AND TRANSMISSION METHOD

CROSS-REFERENCE TO RELATED APPLICATIONS

This application is a 371 U.S. National Phase of International Application No. PCT/JP2019/042486 filed on Oct. 30, 2019. The entire disclosure of the above application is incorporated herein by reference.

TECHNICAL FIELD

The present invention relates to a transmission apparatus and a transmission method.

BACKGROUND ART

With increase in data communications and diversification of traffic types, studies on highly reliable networks for transferring large-capacity traffic are currently in progress. Optical networks are included in such networks.

The current optical networks include nodes arranged in a ring shape or a mesh shape. Such an arrangement enables a selection of different routes even if a combination of a transmission point and a reception point is the same.

On the other hand, as a technique for transferring traffic with high reliability, uninterrupted switching has been introduced into the optical network (e.g., refer to Patent Literature 1). The uninterrupted switching operates in the following manner. A transmission apparatus on the transmission side copies a main signal to be transmitted. The transmission apparatus on the transmission side transmits the main signal to each of an active system route and a standby system route that are directed to the same reception point. In general, in order to transmit data signals with lower delay, the active system route is a short route, and the standby system route is a longer route. These main signals arrive at a transmission apparatus on the reception side through different routes. A data signal phase difference derived from the route difference occurs between the main signals arrived in this way. Therefore, the transmission apparatus on the transmission side gives a delay, in advance, when the main signal is transmitted through the short route. This prevents the occurrence of the data signal phase difference in the transmission apparatus on the reception side. In a state where the data signal phase difference is 0, the transmission apparatus on the reception side switches between the data signal of the active system and the data signal of the standby system. Thus, the route switching can be realized without bit missing. With the above-mentioned uninterrupted switching, the traffic can be transferred with high reliability on the network.

In addition, in order to reduce maintenance and operation works, research and development on fault predictive sign detection using machine learning or artificial intelligence (AI) is currently in progress. In this fault predictive sign detection, a predictive sign of an apparatus fault is detected based on information obtained through monitoring of the state of the transmission apparatus and the traffic as well as information such as deterioration in light power.

CITATION LIST

Patent Literature

Patent Literature 1: Japanese Unexamined Patent Application, First Publication No. 2008-48213

SUMMARY OF THE INVENTION

Technical Problem

In a conventional fault uninterrupted switching, the switching from an active system path to a standby system path is performed after a fault occurs. Therefore, even in an ordinary operating state where the active system path is used, it was necessary to cause the standby system path to constantly operate and check the normality of the standby system path. Accordingly, even in the ordinary operating state, it was necessary to supply electric power to standby system components, such as a transponder, that are not used for the communication of the main signal.

In view of the above-mentioned circumstances, the present invention intends to provide a transmission apparatus and a transmission method capable of realizing rapid path switching in the event of fault occurrence while reducing the supply amount of electric power.

Means for Solving the Problem

An aspect of the present invention is a transmission apparatus including a first communication unit configured to use a first path for communication when electric power is supplied, a second communication unit configured to use a second path for communication when electric power is supplied, a detection unit configured to detect a fault predictive sign, a control unit configured to supply no electric power to the second communication unit when the detection unit does not detect the fault predictive sign, and start supplying electric power to the second communication unit and perform normality confirmation of the second path when the detection unit detects the fault predictive sign, before switching from the first path to the second path, and a selection unit configured to select and output, when the first communication unit and the second communication unit have received signals, either the signal received by the first communication unit or the signal received by the second communication unit.

An aspect of the present invention is a transmission method for a transmission apparatus including a first communication unit configured to use a first path for communication when electric power is supplied and a second communication unit configured to use a second path for communication when electric power is supplied. The transmission method includes a communication step in which the first communication unit performs communication using the first path, a detection step of detecting a fault predictive sign, a control step of supplying no electric power to the second communication unit in the case of no detection of the fault predictive sign, and starting supplying electric power to the second communication unit and performing normality confirmation of the second path in the case of detection of the fault predictive sign, before switching from the first path to the second path, and a selection step of selecting and outputting, when the first communication unit and the second communication unit have received signals, either the signal received by the first communication unit or the signal received by the second communication unit.

Effects of the Invention

The present invention can realize rapid path switching in the event of fault occurrence while reducing the supply amount of electric power.

DESCRIPTION OF EMBODIMENTS

Figure 7:
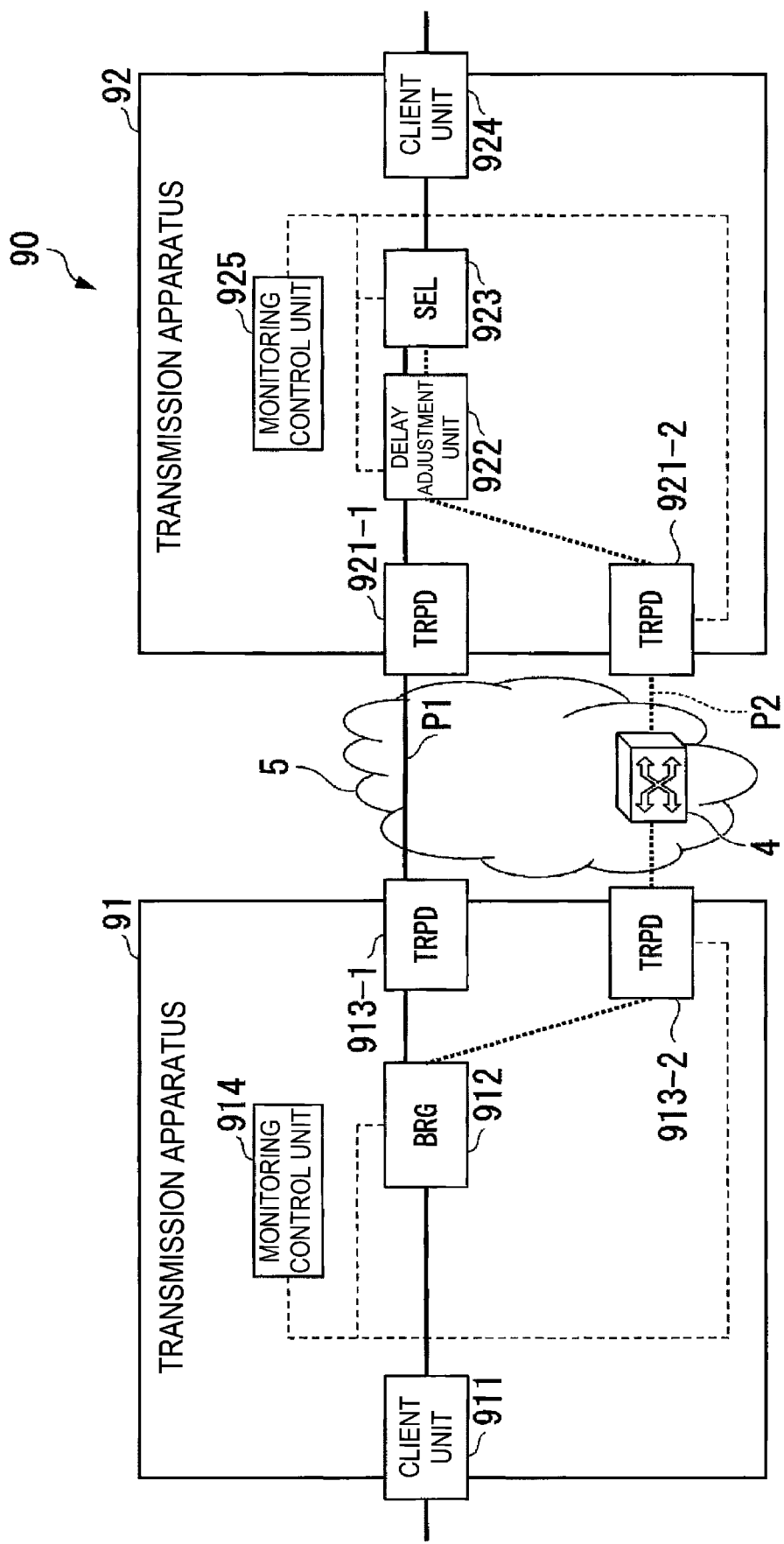
FIG. 7 is a configuration diagram illustrating a transmission system to which a conventional technique is applied.

First, a transmission system to which a conventional technique is applied will be described. FIG. 7 is a configuration diagram illustrating a transmission system 90 to which the conventional technique is applied. The transmission system 90 is an optical transmission system that performs 1:1 uninterrupted switching. A transmission apparatus 91 on the transmission side and a transmission apparatus 92 on the reception side are connected by an active system path P1 and a standby system path P2 in a network 5. The standby system path P2 is a communication route longer than the active system path P1. The standby system path P2 illustrated in FIG. 7 extends via a switch 4.

A client unit 911 of the transmission apparatus 91 has a client port. The client port of the client unit 911 receives a main signal transmitted by a client apparatus. A bridge unit (BRG) 912 copies the main signal received by the client port. The bridge unit 912 outputs the main signal to both of a transponder unit (TRPD) 913-1 and a transponder unit 913-2. The transponder unit 913-1 and the transponder unit 913-2 are transponders on the line side. The transponder unit 913-1 converts the main signal received from the bridge unit 912 into an optical signal, and outputs the converted optical signal to the active system path P1. The transponder unit 913-2 converts the signal received from the bridge unit 912 into an optical signal, and outputs the converted optical signal to the standby system path P2. A monitoring control unit 914 monitors and controls each unit in the apparatus.

A transponder unit 921-1 and a transponder unit 921-2 on the line side of the transmission apparatus 92 are transponders on the line side. The transponder unit 921-1 receives the optical signal transmitted through the active system path P1, and converts the received optical signal into an electric signal. The transponder unit 921-1 outputs the main signal converted into the electric signal to a delay adjustment unit 922. The transponder unit 921-2 receives the optical signal transmitted through the standby system path P2, and converts the received optical signal into an electric signal. The transponder unit 921-2 outputs the main signal converted into the electric signal to the delay adjustment unit 922. The delay adjustment unit 922 gives a delay to the main signal transmitted through the active system path P1, so as to eliminate the delay difference between the main signal transmitted through the active system path P1 and the main signal transmitted through the standby system path P2. A selector unit (SEL) 923 selects either the main signal transmitted through the active system path P1 or the main signal transmitted through the standby system path P2, and outputs the selected signal to a client unit 924. The client unit 924 has a client port. The client unit 924 outputs the main signal received from the selector unit 923 from the client port.

A monitoring control unit 925 monitors and controls each unit in the apparatus. During normal operation, the monitoring control unit 925 instructs the selector unit 923 to select the main signal transmitted through the active system path P1. After switching of the path from the active system path P1 to the standby system path P2 due to occurrence of a failure in the active system path P1, for example, the monitoring control unit 925 instructs the selector unit 923 to select the main signal transmitted through the standby system path P2.

In preparation for the fault uninterrupted switching, the monitoring control unit 914 of the transmission apparatus 91 confirms the normality of the standby system, including the bridge unit 912 and the transponder unit 913-2, constantly even during normal operation, by confirming communication of the main signal. Similarly, in preparation for the fault uninterrupted switching, the monitoring control unit 925 of the transmission apparatus 92 checks the normality of the standby system, including the transponder unit 921-2, the delay adjustment unit 922, and the selector unit 923, constantly even during normal operation. As described above, even during normal operation, the transmission system 90 is required to supply electric power to the apparatus and devices, such as transponders not used for communication of the main signal, and check the normality.

Hereinafter, embodiments of the present invention will be described in detail with reference to the drawings. When a fault predictive sign of the active system path is detected, a transmission apparatus according to the present embodiment is triggered by this detection and supplies electric power to the devices and equipment belonging to the standby system path, and further checks the normality of the standby system path. For example, machine learning or AI can be used to detect the fault predictive sign of the active system path. The normality check of the standby system path includes, for example, a loopback test. When a path switching trigger occurs after the normality check is completed, the transmission apparatus performs switching from the active system path to the standby system path. The path switching trigger is, for example, continuation of the fault predictive sign for a certain period of time, input of a manual switching instruction from an operator who has confirmed the fault predictive sign, and the like.

The transmission apparatus of the present embodiment can complete the normality check of the standby system path before actually switching the transmission of the main signal from the active system path to the standby system path, while reducing the electric power supply to the devices and equipment of the standby system path. Further, it is possible to slow down the deterioration speed of the device or equipment in the standby system path due to power-on.

Figure 1:
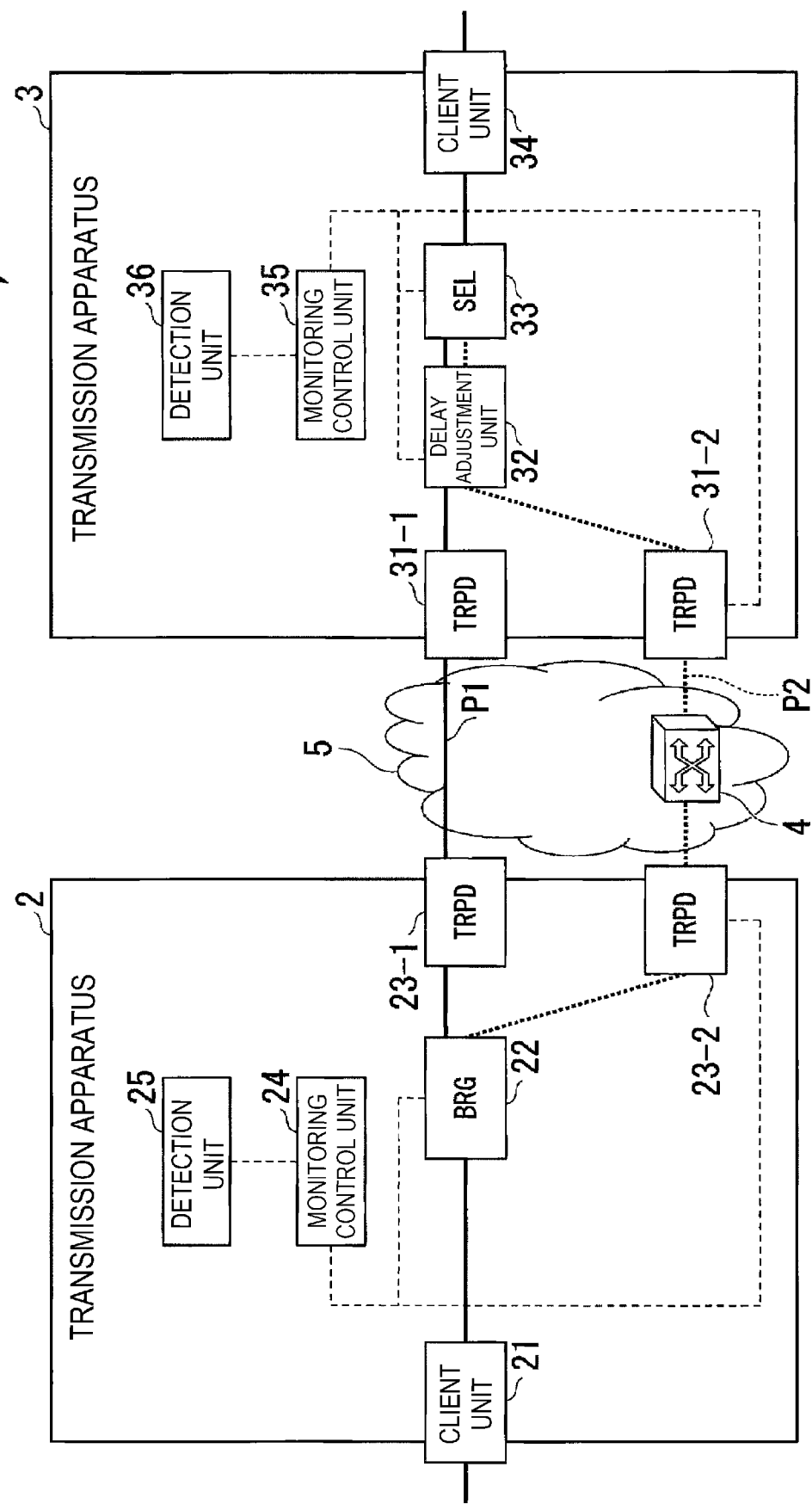
FIG. 1 is a configuration diagram illustrating a transmission system according to an embodiment of the present invention.

FIG. 1 is a configuration diagram illustrating a transmission system 1 according to an embodiment of the present invention. The transmission system 1 illustrated in the drawing performs 1:1 uninterrupted switching. The transmission system 1 is, for example, an optical transmission system. The transmission system 1 includes a transmission apparatus 2 on the transmission side and a transmission apparatus 3 on the reception side. The transmission apparatus 2 and the transmission apparatus 3 are connected by the active system path P1 and the standby system path P2 in the network 5, like the transmission system 90 illustrated in FIG. 7. The standby system path P2 is a communication route longer than the active system path P1. For example, the standby system path P2 extends via at least one switch 4. Alternatively, the standby system path P2 may not extend via the switch 4.

The transmission apparatus 2 includes a client unit 21, a bridge unit 22, a transponder unit 23-1, a transponder unit 23-2, a monitoring control unit 24, and a detection unit 25. The client unit 911, the transponder unit 913-1, and the transponder unit 913-2 of the transmission apparatus 91 illustrated in FIG. 7 can be used as the client unit 21, the transponder unit 23-1, and the transponder unit 23-2.

The client unit 21 has at least one client port. The client port of the client unit 21 receives a main signal transmitted from a client apparatus. The client unit 21 outputs the main signal received by the client port to the bridge unit (BRG) 22.

The bridge unit 22 outputs the main signal received from the client unit 21 to the transponder unit 23-1. Alternatively, the bridge unit 22 copies the main signal received from the client unit 21, and then outputs one main signal to the transponder unit 23-1 and outputs the other main signal to the transponder unit 23-2. The bridge unit 22 performs one of the above processes depending on an instruction from the monitoring control unit 24.

The transponder unit 23-1 and the transponder unit 23-2 are transponders on the line side. The transponder unit 23-1 and the transponder unit 23-2 perform communication when electric power is supplied. The transponder unit 23-1 converts the electric signal received from the bridge unit 22 into an optical signal, and outputs the converted optical signal to the active system path P1. The transponder unit 23-2 converts the electric signal input from the bridge unit 22 into an optical signal, and outputs the converted optical signal to the standby system path P2. During normal operation in which no fault has occurred in the active system and no fault predictive sign is detected, no electric power is supplied to the transponder unit 23-2.

The monitoring control unit 24 controls each unit in the transmission apparatus 2. The monitoring control unit 24 instructs the bridge unit 22 to output the main signal to the transponder unit 23-1, during normal operation. The monitoring control unit 24 starts supplying electric power to the transponder unit 23-2 in response to detection of a fault predictive sign of the active system during normal operation, and further performs control so as to check the normality of the standby system. The monitoring control unit 24 further instructs the bridge unit 22 to output the main signal to the transponder unit 23-1 and the transponder unit 23-2 in response to detection of the fault predictive sign of the active system. Further, the monitoring control unit 24 monitors each unit in the transmission apparatus 2, the active system path P1, and the standby system path P2. The monitoring control unit 24 outputs monitoring results to the detection unit 25.

The detection unit 25 collects fault predictive sign source information, and detects a fault predictive sign in the active system path P1 based on the collected fault predictive sign source information. In response to detection of the fault predictive sign, the detection unit 25 outputs fault predictive sign information to the monitoring control unit 24. The fault predictive sign information is information to be output in response to detection of the fault predictive sign in the device or apparatus configuring the route of the active system path P1 or between these apparatuses. The device configuring the route of the active system path P1 is, for example, a digital signal processor (DSP) for optical communication. The fault predictive sign source information is information for generating the fault predictive sign information. The fault predictive sign source information may include monitoring results received from the monitoring control unit 24, or may include apparatus state and message received from the apparatus configuring the route of the active system path P1, for example. The fault predictive sign source information is, for example, physical state data of a signal acquired from the DSP for optical communication. Further, the fault predictive sign source information may be warning generated in the apparatus configuring the route of the active system path P1.

The transmission apparatus 3 includes a transponder unit 31-1, a transponder unit 31-2, a delay adjustment unit 32, a selector unit (SEL) 33, a client unit 34, a monitoring control unit 35, and a detection unit 36. The transponder unit 921-1, the transponder unit 921-2, the delay adjustment unit 922, the selector unit 923, and the client unit 924 of the transmission apparatus 92 illustrated in FIG. 7 can be used as the transponder unit 31-1, the transponder unit 31-2, the delay adjustment unit 32, the selector unit 33, and the client unit 34.

The transponder unit 31-1 and the transponder unit 31-2 are transponders on the line side. The transponder unit 31-1 and the transponder unit 31-2 perform communication, when electric power is supplied. The transponder unit 31-1 receives the optical signal transmitted through the active system path P1, and converts the received optical signal into an electric signal. The transponder unit 31-1 outputs the converted electric signal to the delay adjustment unit 32. The transponder unit 31-2 receives the optical signal transmitted through the standby system path P2, and converts the received optical signal into an electric signal. The transponder unit 31-2 outputs the converted electric signal to the delay adjustment unit 32. During normal operation, no electric power is supplied to the transponder unit 31-2.

The delay adjustment unit 32 receives the main signal transmitted through the active system path P1 from the transponder unit 31-1, during normal operation. The delay adjustment unit 32 outputs the main signal received during normal operation, according to an instruction of the monitoring control unit 35, without any delay, to the selector unit 33. In response to detection of the fault predictive sign of the active system path P1, the delay adjustment unit 32 receives the main signal transmitted through the active system path P1 from the transponder unit 31-1, and receives the main signal transmitted through the standby system path P2 from the transponder unit 31-2. The delay adjustment unit 32 gives a delay to the main signal transmitted through the active system path P1 according to an instruction of the monitoring control unit 35, and then outputs the delayed signal to the selector unit 33. Further, the delay adjustment unit 32 outputs the main signal transmitted through the standby system path P2, without any delay, to the selector unit 33.

The selector unit 33 receives the main signal transmitted through the active system path P1 from the delay adjustment unit 32, during normal operation, according to an instruction of the monitoring control unit 35, and outputs the received main signal to the client unit 34. In response to detection of the fault predictive sign of the active system path P1, the selector unit 33 receives, from the delay adjustment unit 32, the main signal transmitted through the active system path P1 and the main signal transmitted through the standby system path P2. The selector unit 33 selects either the main signal transmitted through the active system path P1 or the main signal transmitted through the standby system path P2, according to an instruction of the monitoring control unit 35, and then outputs the selected signal to the client unit 34.

The client unit 34 has at least one client port. The client unit 34 outputs, from the client port, the main signal received from the selector unit 33.

The monitoring control unit 35 controls each unit in the transmission apparatus 3. During normal operation, the monitoring control unit 35 instructs the delay adjustment unit 32 so as to output the main signal transmitted through the active system path P1 to the selector unit 33 without adding any delay. Further, during normal operation, the monitoring control unit 35 instructs the selector unit 33 so as to output the main signal transmitted through the active system path P1 to the client unit 34. In response to detection of the fault predictive sign of the active system during normal operation, the monitoring control unit 35 starts supplying electric power to the transponder unit 31-2 and checks the normality of the standby system. Further, in response to detection of the fault predictive sign of the active system, the monitoring control unit 35 instructs the delay adjustment unit 32 to give a delay to the main signal transmitted through the active system path P1 so as to set the delay difference from the main signal transmitted through the standby system path P2 to 0. In response to occurrence of fault in the active system or input of a switching instruction from an operator, the monitoring control unit 35 instructs the selector unit 33 so as to output the main signal output from the transponder unit 31-2 to the client unit 34. Further, the monitoring control unit 35 monitors each unit in the transmission apparatus 3, the active system path P1, and the standby system path P2. The monitoring control unit 35 outputs monitoring results to the detection unit 36.

Similar to the detection unit 25 of the transmission apparatus 2, the detection unit 36 collects the fault predictive sign source information, and detects a fault predictive sign in the active system path P1 based on the collected fault predictive sign source information. In response to detection of the fault predictive sign, the detection unit 36 outputs fault predictive sign information to the monitoring control unit 35.

Figure 2:
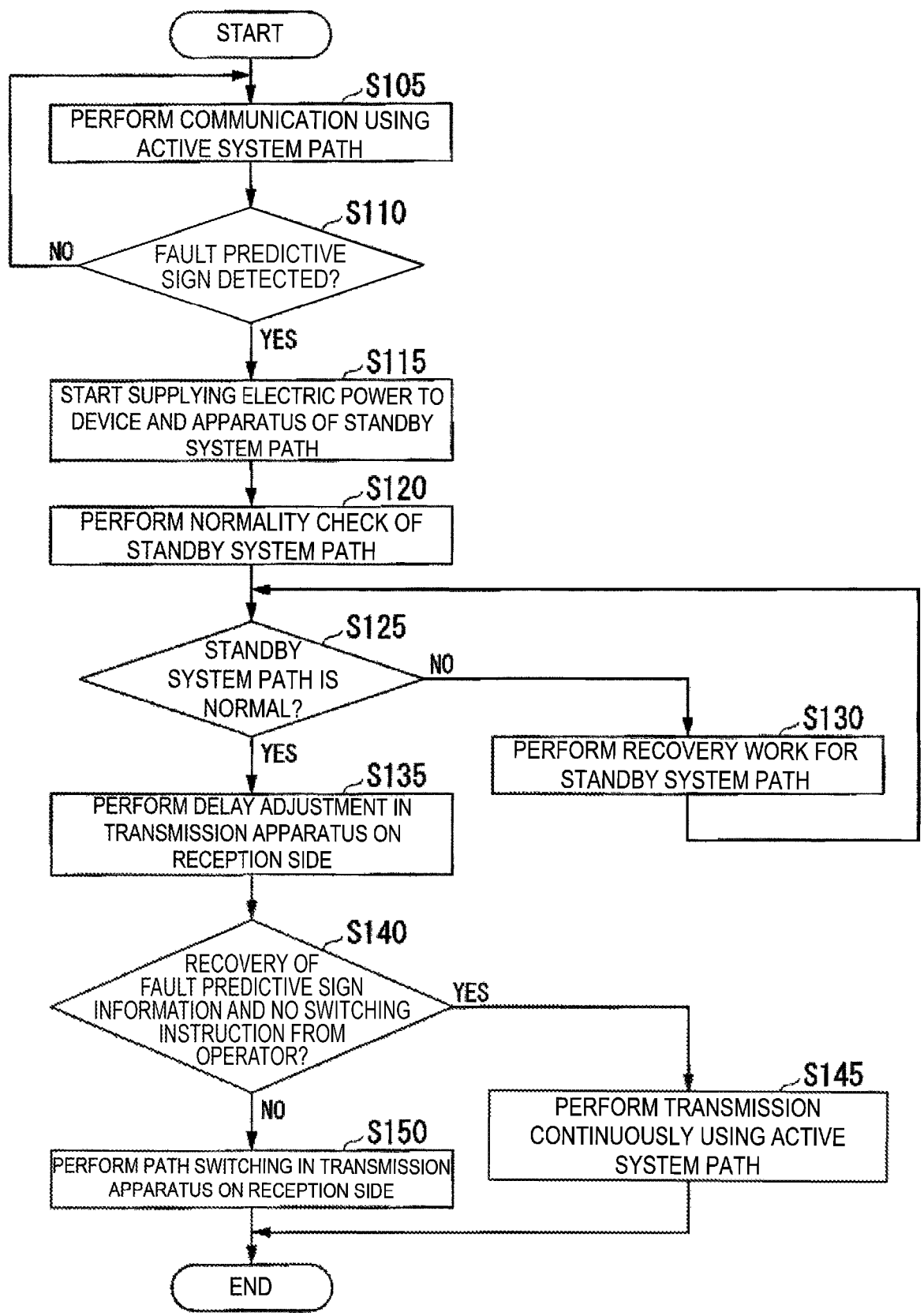
FIG. 2 is a flow diagram illustrating an operation of the transmission system according to the same embodiment.

FIG. 2 is a flow diagram illustrating an operation of the transmission system 1. During normal operation, the transmission system 1 performs communication using the active system path P1 (step S105). Specifically, the bridge unit 22 of the transmission apparatus 2 outputs the main signal received from the client unit 21 to the transponder unit 23-1, according to an instruction of the monitoring control unit 24. The transponder unit 23-1 outputs the main signal converted into the optical signal to the active system path P1. The transponder unit 31-1 of the transmission apparatus 3 receives the main signal transmitted through the active system path P1. The transponder unit 31-1 converts the received main signal into an electric signal and outputs the converted signal to the delay adjustment unit 32. According to an instruction of the monitoring control unit 35, the delay adjustment unit 32 outputs the main signal, without adding any delay, to the selector unit 33. According to an instruction of the monitoring control unit 35, the selector unit 33 outputs the main signal to the client unit 34. The client unit 34 outputs the main signal to the outside of the apparatus.

During normal operation in which the detection unit 25 of the transmission apparatus 2 and the detection unit 36 of the transmission apparatus 3 detect no fault predictive sign (NO in step S110), the transmission system 1 performs processing of step S105. When the detection unit 25 of the transmission apparatus 2 or the detection unit 36 of the transmission apparatus 3 detects a fault predictive sign (YES in step S110), the transmission system 1 performs processing of step S115 and following steps. For example, when fault predictive sign information such as deterioration of light power in the active system path P1 is detected, the transmission system 1 starts supplying electric power to the apparatus and devices of the standby system path P2, and starts the normality check. It is assumed that at the detection time of the fault predictive sign, the active system path P1 enables the main signal to communicate.

The transmission system 1 performs the processing of steps S115 to S130 in each of the transmission apparatus 2 and the transmission apparatus 3. First, the processing of the transmission apparatus 2 in steps S115 to S130 will be described.

The monitoring control unit 24 of the transmission apparatus 2 acquires the fault predictive sign information from the detection unit 25. Alternatively, the monitoring control unit 24 receives the fault predictive sign information from the transmission apparatus 3. In this case, the monitoring control unit 24 may acquire the fault predictive sign information set by the detection unit 36 of the transmission apparatus 3 from, for example, the overhead (OH) of the optical signal received from the transmission apparatus 3 using the active system path P1.

Alternatively, the monitoring control unit 24 may receive the fault predictive sign information output by the detection unit 36 of the transmission apparatus 3 via a control network or the like.

Here, the output of the fault predictive sign information in the detection unit 25 will be described. The detection unit 25 collects the fault predictive sign source information from each device or each functional unit in the transmission apparatus 2, for example, directly or via the monitoring control unit 24. The detection unit 25 may acquire the fault predictive sign source information acquired by the transmission apparatus 3 from, for example, the overhead of the optical signal output from the transmission apparatus 3 and transmitted through the active system path P1. Further, the detection unit 25 may receive the fault predictive sign source information transmitted from the transmission apparatus 3 via the control network or the like.

The detection unit 25 may set the acquired fault predictive sign source information in the overhead of the main signal to be transmitted through the active system path P1 and transmit it to the transmission apparatus 3, and also may notify the detection unit 36 of the transmission apparatus 3 of the acquired fault predictive sign source information via the control network (not illustrated).

The detection unit 25 generates fault predictive sign information if it determines that a fault predictive sign is detected in the device or apparatus configuring the route of the active system path P1, or between these apparatuses, based on the acquired fault predictive sign source information. The detection unit 25 outputs the generated fault predictive sign information to the monitoring control unit 24. The detection unit 25 may set the generated fault predictive sign information in the overhead of the main signal to be transmitted through the active system path P1 and notify the transmission apparatus 3 of it, and may transmit it to the transmission apparatus 3 via the control network.

In response to acquisition of the fault predictive sign information, the monitoring control unit 24 of the transmission apparatus 2 starts supplying electric power to the apparatus and devices of the standby system, including the transponder unit 23-2, when no electric power is supplied to them (step S115).

Further, the monitoring control unit 24 starts checking whether the bridge unit 22 and the transponder unit 23-2 belonging to the standby system path P2 operate normally by the supply of electric power (step S120). For example, after instructing the bridge unit 22 to copy the data, the monitoring control unit 24 confirms whether the same data as the data transmitted by the bridge unit 22 to the active system path P1 is transmitted to the standby system path P2 side. Further, the monitoring control unit 24 controls the transponder unit 23-2 in such a manner that connection confirmation such as loopback test or delay measurement, for example, is performed between the transponder unit 23-2 and the transponder unit 31-2 of the transmission apparatus 3. As a result, the monitoring control unit 24 confirms the normality of the standby system path P2. At the time of the normality check, for example, the overhead of OTN of the optical signal may be used to perform the connection confirmation. The monitoring control unit 24 may set the normality check result in the overhead of the main signal to be transmitted through the active system path P1, or may notify the monitoring control unit 35 of the transmission apparatus 3 of it via the control network.

Next, the processing of the transmission apparatus 3 in steps S115 to S130 will be described. The monitoring control unit 35 of the transmission apparatus 3 acquires the fault predictive sign information from the detection unit 36. The monitoring control unit 35 may receive the fault predictive sign information from the transmission apparatus 2. In this case, the monitoring control unit 35 may acquire the fault predictive sign information output by the detection unit 25 of the transmission apparatus 2 from, for example, the overhead (OH) of the optical signal received from the transmission apparatus 2 using the active system path P1. Further, the monitoring control unit 35 may receive the fault predictive sign information output by the detection unit 25 of the transmission apparatus 2 via the control network or the like.

Here, the output of the fault predictive sign information in the detection unit 36 will be described. Similar to the detection unit 25 of the transmission apparatus 2, the detection unit 36 collects the fault predictive sign source information from, for example, each device or a functional unit in the transmission apparatus 3. The detection unit 36 may set the acquired fault predictive sign source information in the overhead of the main signal to be transmitted through the active system path P1 and transmit it to the transmission apparatus 2, or may notify the detection unit 25 of the transmission apparatus 2 of it via the control network (not illustrated). Further, the detection unit 36 may acquire the fault predictive sign source information acquired by the transmission apparatus 2 from, for example, the overhead of the optical signal output from the transmission apparatus 2 and transmitted through the active system path P1. Further, the detection unit 36 may receive the fault predictive sign source information transmitted from the transmission apparatus 2 via the control network or the like.

The detection unit 36 generates fault predictive sign information if it determines that a fault predictive sign is detected in the device or apparatus configuring the route of the active system path P1, or between these apparatuses, for example, based on the acquired fault predictive sign source information. The detection unit 36 outputs the generated fault predictive sign information to the monitoring control unit 35. The detection unit 36 may set the generated fault predictive sign information in the overhead of the main signal to be transmitted through the active system path P1 and notify the transmission apparatus 2 of it, and may transmit it to the transmission apparatus 2 via the control network.

In response to acquisition of the fault predictive sign information, the monitoring control unit 35 of the transmission apparatus 3 starts supplying electric power to the apparatus and devices of the standby system, including the transponder unit 31-2, when no electric power is supplied to them (step S115). Further, the monitoring control unit 35 starts checking whether the transponder unit 31-2, the delay adjustment unit 32, and the selector unit 33 belonging to the standby system path P2 operate normally (step S120). For example, the monitoring control unit 35 confirms whether the transponder unit 31-2, the delay adjustment unit 32, and the selector unit 33 have operated normally by the supply of electric power. Further, the monitoring control unit 35 controls the transponder unit 31-2 in such a manner that connection confirmation such as loopback test or delay measurement, for example, is performed between the transponder unit 31-2 and the transponder unit 23-2 of the transmission apparatus 2. As a result, the monitoring control unit 35 confirms the normality of the standby system path P2. At the time of the normality check, for example, the overhead of OTN of the optical signal may be used to perform the connection confirmation. The monitoring control unit 35 may set the normality check result in the overhead of the main signal to be transmitted through the active system path P1, or may notify the monitoring control unit 24 of the transmission apparatus 2 of it via the control network.

The monitoring control unit 24 of the transmission apparatus 2 and the monitoring control unit 35 of the transmission apparatus 3 determine whether the standby system path P2 is normal (step S125). When at least one of the monitoring control unit 24 of the transmission apparatus 2 and the monitoring control unit 35 of the transmission apparatus 3 determines that the standby system path P2 is not normal (NO in step S125), the transmission system 1 performs the recovery work for the standby system path P2 (step S130), and repeats the processing from step S125.

In the case of notifying the normality check result between the transmission apparatus 2 and the transmission apparatus 3, when the processing up to step S120 is not yet completed in the transmission apparatus 3, even if the processing up to step S120 is already completed in the transmission apparatus 2, the determination result in step S125 becomes NO. Similarly, when the processing up to step S120 is not completed in the transmission apparatus 2, even if the processing up to step S120 is already completed in the transmission apparatus 3, the determination result in step S125 becomes NO.

The monitoring control unit 35 of the transmission apparatus 3, if it determines that the normality check of the standby system path P2 is normal (YES in step S125), performs processing of step S135. That is, the monitoring control unit 35 instructs the delay adjustment unit 32 to start delay adjustment, in order to buffer the main signal transmitted through the active system path P1. In response to reception of the instruction from the monitoring control unit 35, the delay adjustment unit 32 starts the delay adjustment. The delay adjustment is performed, for example, by a method for controlling the amount of data stored in a first in first out (FIFO) memory. This is because the signal transmitted via the active system path P1 arrives earlier than the signal transmitted via the standby system path P2. The monitoring control unit 35 confirms that the delay difference between the main signals caused by the route difference between the active system path P1 and the standby system path P2 becomes zero (step S135).

When the data is not yet copied by the bridge unit 22, the monitoring control unit 35 of the transmission apparatus 3 sets the delay difference between the active system path P1 and the standby system path P2 to zero and then notifies the monitoring control unit 24 of the transmission apparatus 2 of completion of the delay difference adjustment. For example, the monitoring control unit 35 sets the completion of the delay difference adjustment in the overhead of the main signal to be transmitted through the active system path P1, or notifies the monitoring control unit 24 of the transmission apparatus 2 of it via the control network. In response to reception of the adjustment completion notification, the monitoring control unit 24 of the transmission apparatus 2 instructs the bridge unit 22 to copy the data if the data is not yet copied by the bridge unit 22. In response to reception of this instruction, the bridge unit 22 copies the main signal received from the client unit 21.

The main signal to be transmitted via the active system path P1 is referred to as an active system main signal, and the copied main signal transmitted via the standby system path P2 is referred to as a standby system main signal. The bridge unit 22 transmits the active system main signal to the transponder unit 23-1 corresponding to the active system path P1, and transmits the standby system main signal to the transponder unit 23-2 corresponding to the standby system path P2. The transponder unit 23-1 outputs the active system main signal, which is converted into an optical signal, to the active system path P1. The transponder unit 23-2 outputs the standby system main signal, which is converted into an optical signal, to the standby system path P2.

The transponder unit 31-1 of the transmission apparatus 3 receives the active system main signal transmitted through the active system path P1. The transponder unit 31-1 converts the received active system main signal from the optical signal into an electric signal and then outputs the converted signal to the delay adjustment unit 32. The transponder unit 31-2 receives the standby system main signal received via the standby system path P2. The transponder unit 31-2 converts the received standby system main signal from the optical signal into an electric signal and then outputs the converted signal to the delay adjustment unit 32. The delay adjustment unit 32 confirms that the delay difference between the active system main signal and the standby system main signal of the same main signal is zero, and then outputs the active system main signal and the standby system main signal to the selector unit 33. The selector unit 33 selects the active system main signal and outputs the selected active system main signal to the client unit 34.

The monitoring control unit 35 of the transmission apparatus 3, when it determines that both of conditions (1) and (2) are satisfied (YES in step S140), performs control in such a way as to continue the transmission to and from the transmission apparatus 2 while continuously using the active system path P1 (step S145). The condition (1) is a condition that the fault predictive sign information has been recovered within a predetermined time, and the condition (2) is a condition that there is no input of a switching instruction from an operator who has confirmed the fault predictive sign information. Under this control, the transmission system 1 continues the processing of step S135, in which the delay adjustment is implemented, and following steps. The transmission system 1 may perform the processing of step S105.

On the other hand, when it is determined that one or both of the conditions (1) and (2) are not satisfied (NO in step S140), the monitoring control unit 35 performs switching from the active system path to the standby system path (step S150). That is, the monitoring control unit 35 instructs the selector unit 33 so as to output the standby system main signal to the client unit 34. In response to reception of the instruction from the monitoring control unit 35, the selector unit 33 outputs the standby system main signal to the client unit 34. The monitoring control unit 35 may perform the switching from the active system path to the standby system path when a fault of the active system path P1 is detected. The monitoring control unit 35 may set the performed path switching in the overhead of the main signal to be transmitted through the active system path P1 or the standby system path P2, or may notify the monitoring control unit 24 of the transmission apparatus 2 of it via the control network. As mentioned above, after the delay difference between the active system main signal and the standby system main signal is set to zero, the selector unit 33 performs path switching between the active system path and the standby system path, so that the uninterrupted switching can be realized. When a fault occurrence is detected in the apparatus or device configuring the active system path P1 or when a fault occurrence notification is received, the monitoring control unit 35 also performs the switching from the active system path to the standby system path.

Figure 3:
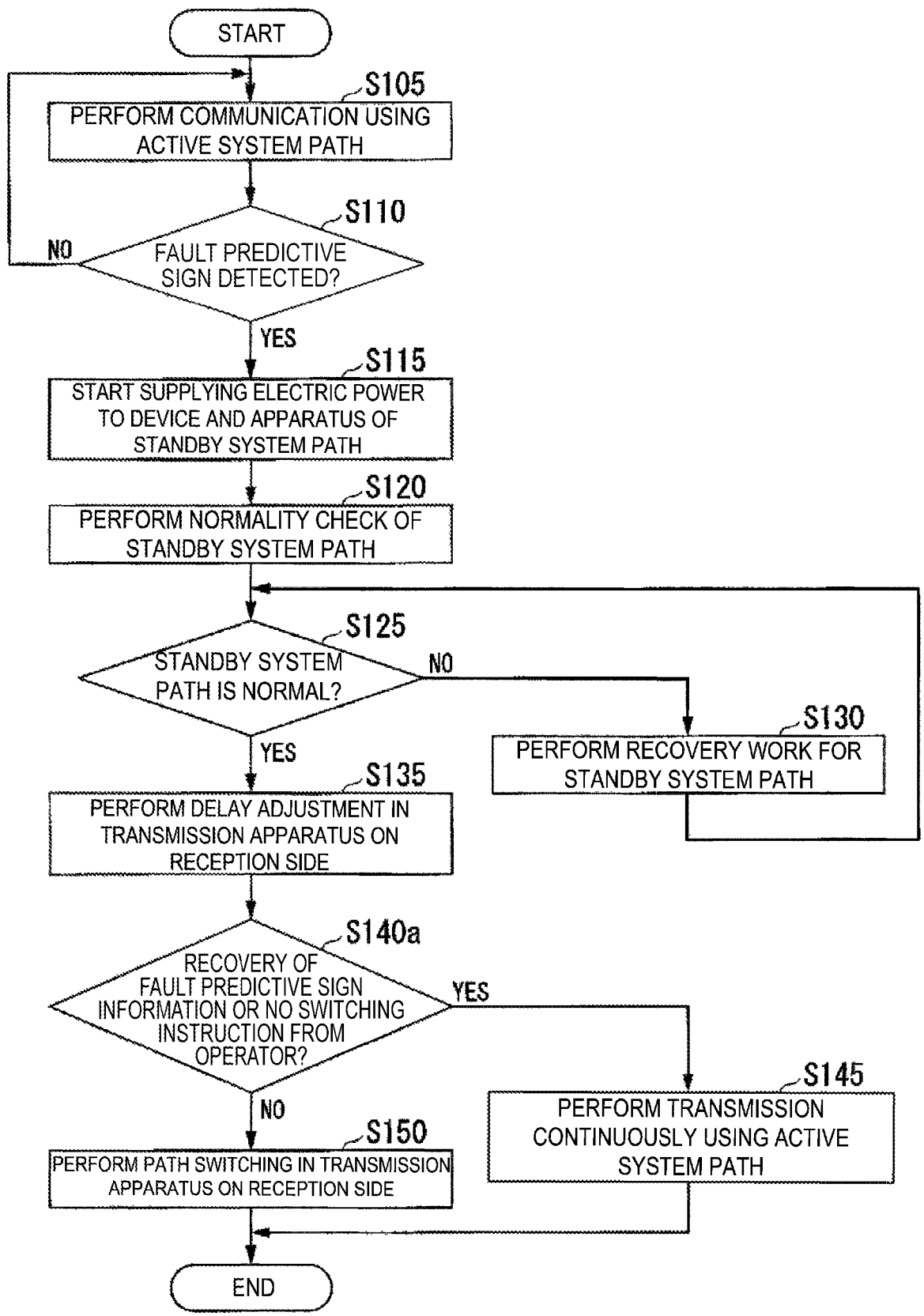
FIG. 3 is a flow diagram illustrating an operation of the transmission system according to the same embodiment.

FIG. 3 is a flow diagram illustrating another operation of the transmission system 1. The transmission system 1 may perform the operation illustrated in the flow diagram of FIG. 3, instead of the operation illustrated in the flow diagram of FIG. 2. In the flow diagram of FIG. 3, the same processing as that in the flow diagram of FIG. 2 is denoted by the same reference numeral and the description thereof will not be repeated. The processing illustrated in the flow diagram of FIG. 3 is different from the processing illustrated in the flow diagram of FIG. 2 in performing processing of step S140a instead of the processing of step S140. That is, when it is determined that one or both of the conditions (1) and (2) are satisfied (YES in step S140a), the monitoring control unit 35 of the transmission apparatus 3 performs the processing of step S145. Similar to the processing illustrated in the flow diagram of FIG. 2, the condition (1) is a condition that the fault predictive sign information has been recovered within a predetermined time, and the condition (2) is a condition that there is no input of a switching instruction from an operator who has confirmed the fault predictive sign information. On the other hand, when it is determined that both of the conditions (1) and (2) are not satisfied (NO in step S140a), the monitoring control unit 35 performs processing of step S150.

Figure 4:
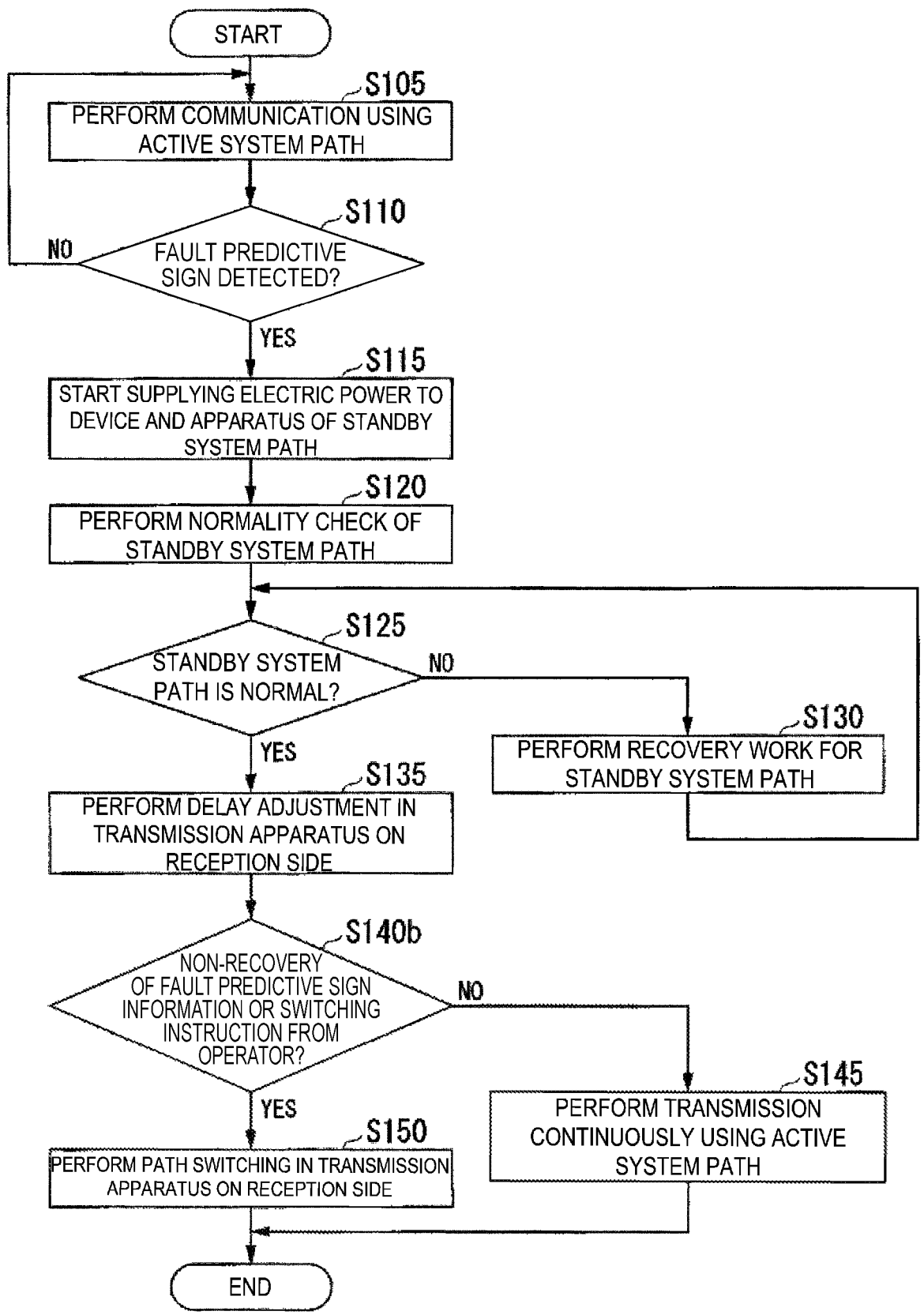
FIG. 4 is a flow diagram illustrating an operation of the transmission system according to the same embodiment.

FIG. 4 is a flow diagram illustrating another operation of the transmission system 1. The transmission system 1 may perform the operation illustrated in the flow diagram of FIG. 4, instead of the operation illustrated in the flow diagram of FIG. 2 or FIG. 3. In the flow diagram of FIG. 4, the same processing as that in the flow diagram of FIG. 2 is denoted by the same reference numeral and the description thereof will not be repeated. The processing illustrated in the flow diagram of FIG. 4 is different from the processing illustrated in the flow diagram of FIG. 2 in performing processing of step S140b instead of the processing of step S140. That is, when it is determined that one or both of conditions (3) and (4) are satisfied (YES in step S140b), the monitoring control unit 35 of the transmission apparatus 3 performs the processing of step S150. The condition (3) is a condition that the fault predictive sign information has not been recovered even after the elapse of a predetermined time, and the condition (4) is a condition that a switching instruction is input by an operator who has confirmed the fault predictive sign information. When it is determined that both of the conditions (3) and (4) are not satisfied (NO in step S140b), the monitoring control unit 35 performs the processing of step S145.

Figure 5:
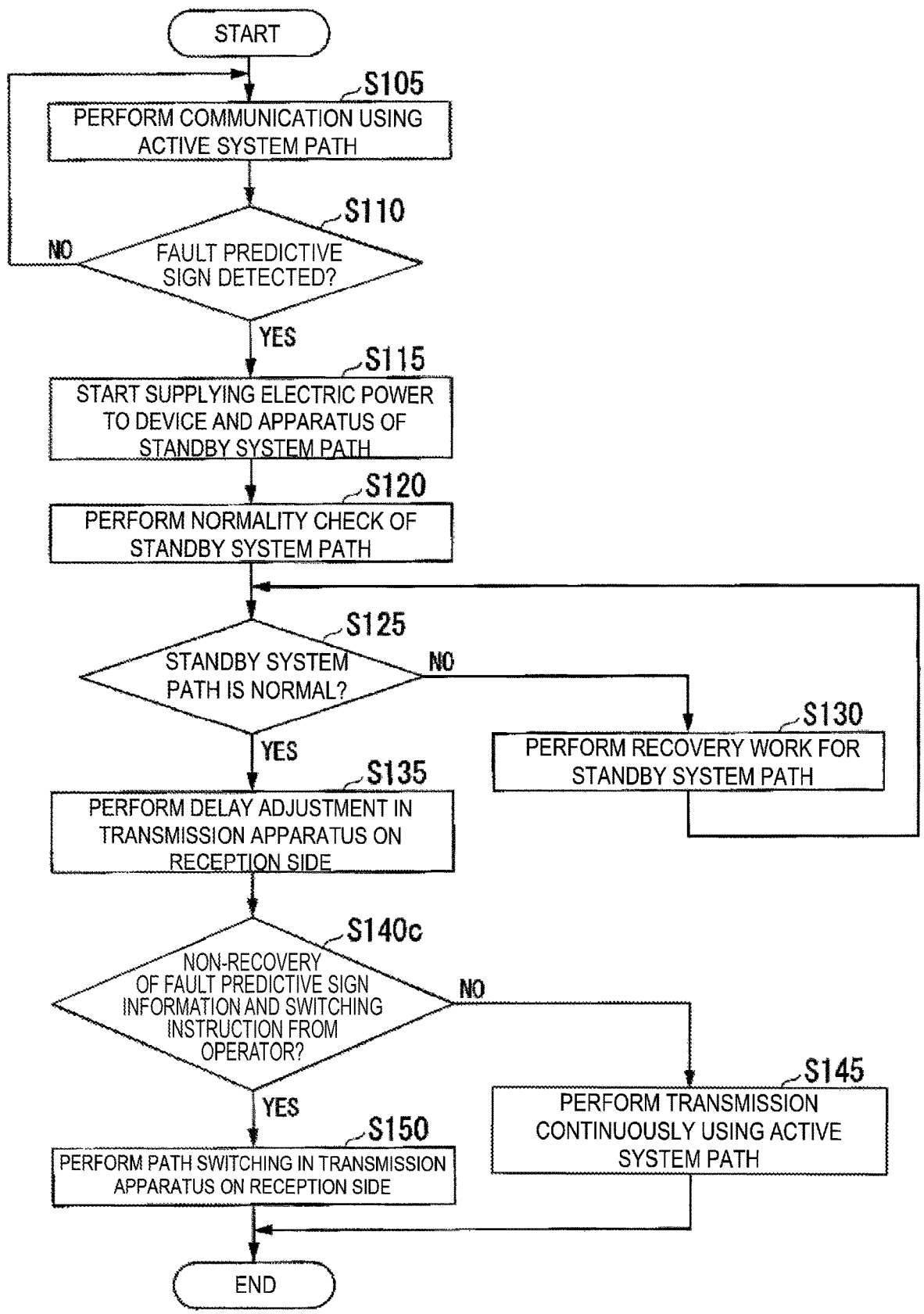
FIG. 5 is a flow diagram illustrating an operation of the transmission system according to the same embodiment.

FIG. 5 is a flow diagram illustrating another operation of the transmission system 1. The transmission system 1 may perform the operation illustrated in the flow diagram of FIG. 5, instead of the operations illustrated in the flow diagrams of FIGS. 2 to 4. In the flow diagram of FIG. 5, the same processing as that in the flow diagram of FIG. 4 is denoted by the same reference numeral and the description thereof will not be repeated. The processing illustrated in the flow diagram of FIG. 5 is different from the processing illustrated in the flow diagram of FIG. 4 in performing processing of step S140c instead of the processing of step S140b. That is, when it is determined that both of the conditions (3) and (4) are satisfied (YES in step S140c), the monitoring control unit 35 of the transmission apparatus 3 performs the processing of step S150. Similar to the processing illustrated in the flow diagram of FIG. 4, the condition (3) is a condition that the fault predictive sign information has not been recovered even after the elapse of a predetermined time, and the condition (4) is a condition that a switching instruction is input by an operator who has confirmed the fault predictive sign information. When it is determined that one or both of the conditions (3) and (4) are not satisfied (NO in step S140c), the monitoring control unit 35 performs the processing of step S145.

As described above, the transmission apparatus includes the detection unit configured to detect a fault predictive sign. During normal operation, the transmission apparatus supplies no electric power to the apparatus and devices used only for the standby system path, such as a standby system transponder. When the detection unit outputs fault predictive sign information of the active system path, the transmission apparatus is triggered by this information and supplies electric power to the devices and equipment belonging to the standby system path and starts checking the normality of the standby system path. As mentioned above, during normal operation, the transmission apparatus does not cause the transponder or the like of the standby system path to operate. Therefore, it is possible to perform path switching by performing the normality check triggered by the fault predictive sign information, while greatly reducing the electric power supply.

Although the bit missing-less uninterrupted switching is exemplarily described in the present embodiment, a switching that permits bit missing within 50 milliseconds (ms), which is stipulated in the ITU-T G.841 recommendation, may be performed in the switching between the active system path and the standby system path. In this case, the monitoring control unit 35 instructs the delay adjustment unit 32 so as to suppress the delay difference between the main signal transmitted through the active system path P1 and the main signal transmitted through the standby system path P2 within 50 ms. The delay adjustment unit 32 gives a delay to the main signal transmitted through the active system path P1 so that the delay difference from the main signal transmitted through the standby system path P2 is within 50 milliseconds (ms).

The fault predictive sign information may be information obtained through analysis on the fault predictive sign source information collected from one or a plurality of apparatuses, using an information analysis method such as machine learning or deep learning. Further, the fault predictive sign information may be information processed based on an operator's network operation policy. Further, the fault predictive sign information may be information that combines them.

The detection unit 25 of the transmission apparatus 2 may generate the fault predictive sign information based on the fault predictive sign source information in its own apparatus, or may generate the fault predictive sign information based on the fault predictive sign source information in its own apparatus and the fault predictive sign source information received via the control network or the like.

Similarly, the detection unit 36 of the transmission apparatus 3 may generate the fault predictive sign information based on the fault predictive sign source information in its own apparatus, or may generate the fault predictive sign information based on the fault predictive sign source information in its own apparatus and the fault predictive sign source information received via the control network or the like. Further, the detection unit 25 of the transmission apparatus 2 and the detection unit 36 of the transmission apparatus 3 may receive fault predictive sign information of other apparatus via the control network or the overhead of the main signal and may use the received information as information for generating the fault predictive sign information.

The transmission apparatus 2 and the transmission apparatus 3 may confirm the operation of the switch 4 on the network 5 as a normality check of the functional unit belonging to the standby system path. For example, the transmission apparatus may confirm that electric power can be supplied to the switch 4 or that setting to a desired route is feasible. The normality check result on the network 5 may be transmitted or received between the transmission apparatus 2 and the transmission apparatus 3 with the overhead of the main signal, and may be transmitted or received via the control network.

Figure 6:
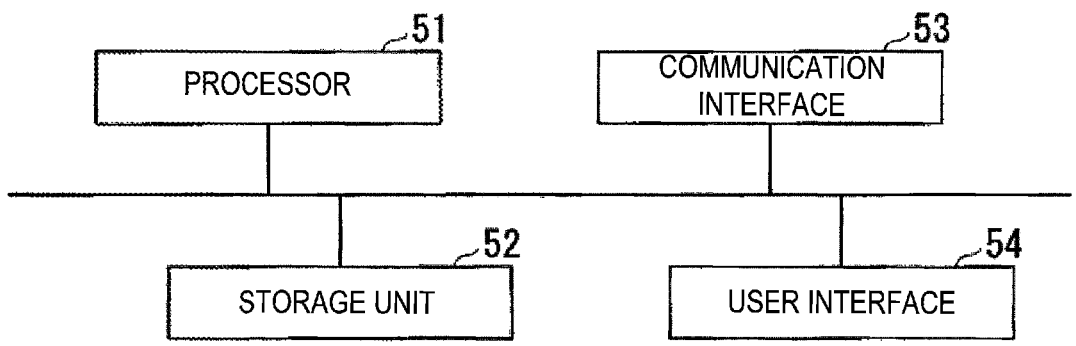
FIG. 6 is a diagram illustrating a hardware configuration of the transmission apparatus according to the same embodiment.

An exemplary hardware configuration of the transmission apparatus 2 and the transmission apparatus 3 will be described. FIG. 6 is a apparatus configuration diagram illustrating the exemplary hardware configuration of the transmission apparatus 2 and the transmission apparatus 3. The transmission apparatus 2 and the transmission apparatus 3 include a processor 51, a storage unit 52, a communication interface 53, and a user interface 54.

The processor 51 is a central processing unit that performs calculations and controls. The processor 51 is, for example, a CPU. The processor 51 reads a program from the storage unit 52 and executes it. Further, the storage unit 52 has a work area or the like for the processor 51 to execute various programs. The communication interface 53 is for connecting the transmission device with other apparatus to communicate with each other. The user interface 54 is an input device such as a button, a keyboard, or a pointing device or a display device such as a lamp or a display monitor. The user interface 54 accepts a manually input operation.

The functions of the monitoring control unit 24 and the detection unit 25 of the transmission apparatus 2 can be realized when the processor 51 reads the program from the storage unit 52 and executes it. The whole or a part of these functions may be realized by using hardware such as application specific integrated circuit (ASIC), programmable logic device (PLD), or field programmable gate array (FPGA). The client unit 21, the bridge unit 22, the transponder unit 23-1, and the transponder unit 23-2 of the transmission apparatus 2 are realized by the communication interface 53. Some of these functions may be realized when the processor 51 reads the program from the storage unit 52 and executes it.

Further, the functions of the monitoring control unit 35 and the detection unit 36 of the transmission apparatus 3 are realized when the processor 51 reads the program from the storage unit 52 and executes it. The whole or a part of these functions may be realized by using hardware such as ASIC, PLD, or FPGA. The transponder unit 31-1, the transponder unit 31-2, the delay adjustment unit 32, the selector unit 33, and the client unit 34 of the transmission apparatus 3 can be realized by the communication interface 53. Some of these functions may be realized when the processor 51 reads the program from the storage unit 52 and executes it.

According to the above-described embodiment, the transmission apparatus includes a first communication unit, a second communication unit, a detection unit, a control unit, and a selection unit. The first communication unit uses a first path for communication when electric power is supplied. For example, the first communication unit is the transponder unit 31-1, and the first path is the active system path P1. The second communication unit uses a second path for communication when electric power is supplied. For example, the second communication unit is the transponder unit 31-2, and the second path is the standby system path P2. The detection unit detects a fault predictive sign. The control unit supplies no electric power to the second communication unit when the detection unit does not detect the fault predictive sign. The control unit starts supplying electric power to the second communication unit and performs normality confirmation of the second path when the detection unit detects the fault predictive sign, before switching from the first path to the second path. The control unit is, for example, the monitoring control unit 35. The selection unit selects and outputs, when the first communication unit and the second communication unit have received signals, either the signal received by the first communication unit or the signal received by the second communication unit. The selection unit is, for example, the selector unit 33.

The control unit performs switching from the first path to the second path, in response to a path switching trigger occurring after normality is confirmed by the normality confirmation. The path switching trigger is, for example, continuation of the fault predictive sign detection exceeding a predetermined time, or input of a switching instruction from an operator. The selection unit selects and outputs the signal received by the first communication unit before the switching to the second path, and selects and outputs the signal received by the second communication unit after the switching to the second path.

The transmission apparatus may further include a delay adjustment unit. The delay adjustment unit adjusts a delay difference between the signal received by the first communication unit and the signal received by the second communication unit to be equal to or less than a predetermined delay difference, and outputs the signal with the adjusted delay difference to the selection unit.

Although the embodiments of the present invention have been described in detail with reference to the drawings, the specific configuration is not limited to these embodiments and encompasses designs and the like within a range not deviating from the gist of the present invention.

REFERENCE SIGNS LIST

1 transmission system
2 transmission apparatus
3 transmission apparatus
4 switch
5 network
21 client unit
22 bridge unit
23-1 transponder unit
23-2 transponder unit
24 monitoring control unit
25 detection unit
31-1 transponder unit
31-2 transponder unit
32 delay adjustment unit
33 selector unit
34 client unit
35 monitoring control unit
36 detection unit
51 processor
52 storage unit
53 communication interface
54 user interface
90 transmission system
91 transmission apparatus
92 transmission apparatus
P1 active system path
P2 standby system path

The invention claimed is:

1. A transmission apparatus comprising:
a first transponder configured to use a first path for communication when electric power is supplied;
a second transponder configured to use a second path for communication when electric power is supplied;
a detector configured to detect a fault predictive sign;
a controller configured to supply no electric power to the second transponder when the detector does not detect the fault predictive sign, and start supplying electric power to the second transponder and perform normality confirmation of the second path when the detector detects the fault predictive sign, before switching from the first path to the second path;
a delay adjuster configured to adjust a delay difference between a signal received by the first transponder and a signal received by the second transponder to be equal to or less than a predetermined delay difference, and output the signals with the adjusted delay difference to the selector;
a selector configured to select and output, when the first transponder and the second transponder have received signals, either the signal received by the first transponder or the signal received by the second transponder; and
wherein the controller performs switching from the first path to the second path, in response to a path switching trigger occurring after normality is confirmed by the normality confirmation, and
the selector selects and outputs the signal received by the first transponder before the switching to the second path, and selects and outputs the signal received by the second transponder after the switching to the second path.

2. A transmission method for a transmission apparatus including a first transponder configured to use a first path for communication when electric power is supplied and a second transponder configured to use a second path for communication when electric power is supplied, the method comprising:
performing by the first transponder communication using the first path;
detecting a fault predictive sign;
supplying no electric power to the second transponder in the case of no detection of the fault predictive sign, and starting supplying electric power to the second transponder and performing normality confirmation of the second path in the case of detection of the fault predictive sign, before switching from the first path to the second path;

adjusting a delay difference between a signal received by the first transponder and a signal received by the second transponder to be equal or less than a predetermined delay difference; and selecting and outputting, when the first transponder and the second transponder have received signals, either the signal received by the first transponder or the signal received by the second transponder;

performing switching from the first path to the second path, in response to a path switching trigger occurring after normality is confirmed by the normality confirmation, wherein the signal received by the first transponder is selected and outputted before the switching to the second path, and the signal received by the second transponder is selected and outputted after the switching to the second path.

\* \* \* \* \*